Figure 1:
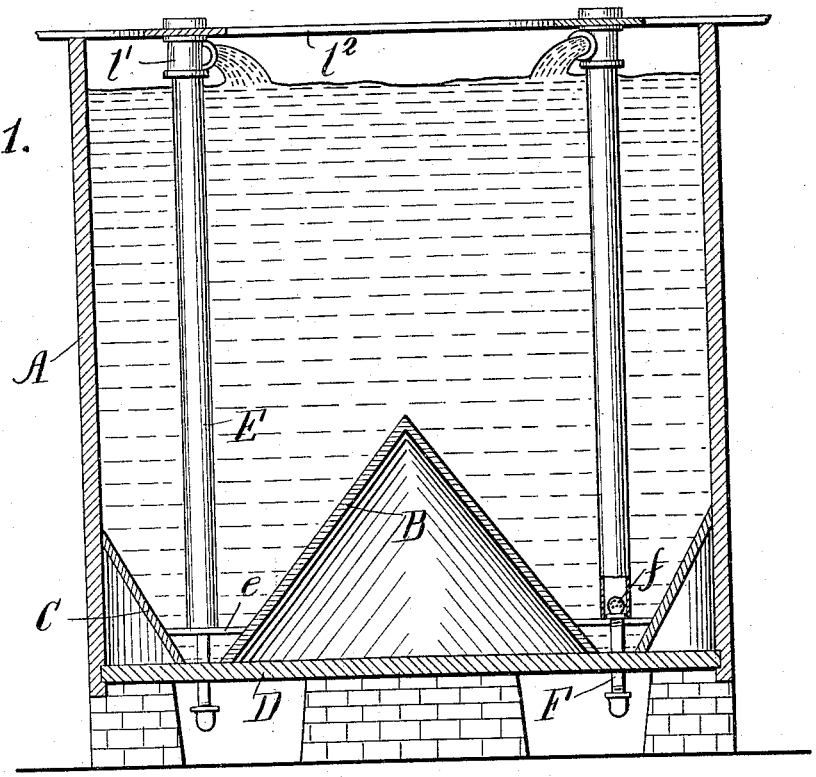

B. MacDONALD.
APPARATUS FOR TREATING ORE PULP.
APPLICATION FILED MAR. 25, 1914.

1,163,097.

Patented Dec. 7, 1915.

WITNESSES

INVENTOR
Bernard MacDonald
BY
ATTORNEYS

UNITED STATES PATENT OFFICE.

BERNARD MacDONALD, OF SOUTH PASADENA, CALIFORNIA.

APPARATUS FOR TREATING ORE-PULP.

1,163,097.  Specification of Letters Patent.  Patented Dec. 7, 1915.

Application filed March 25, 1914. Serial No. 827,046.

*To all whom it may concern:*

Be it known that I, BERNARD MacDONALD, a citizen of the United States, residing at South Pasadena, county of Los Angeles, State of California, have invented certain new and useful Improvements in Apparatus for Treating Ore-Pulp; and I do hereby declare the following to be a full, clear, and exact description of the invention, such as will enable others skilled in the art to which it appertains to make and use the same.

This invention relates to apparatus for use in the treatment of ore pulp and slimes through the agency of any of the usual solvents appropriate for dissolving out the gold and silver values contained therein; it is of special utility in the practice of the cyanid process in the customary manner.

The invention is directed to the provision of a tank of an improved construction for the reception of the slimes and the solvent, the construction being such that the dissolving of the solids contained in the slimes is effected more thoroughly.

The dissolving of the solids contained in ore slimes is considerably retarded if settling of the solids within the tank takes place to any substantial extent. For this reason it has been common heretofore to provide tanks for this purpose with means for effecting the transfer of the slimes continuously from the bottom portion of the tank to the upper portion.

In Patent No. 1,071,447, granted to me August 26, 1913, I disclosed a tank having vertical transfer pipes arranged therein for effecting the transfer of the slimes in this manner, and having outlets from these transfer pipes so disposed that a whirling action of the slimes within the tank is caused to take place. This circular movement of the slimes within the tank causes the solids within the slimes to be held in suspension for a considerably greater period, as a result of which the dissolving action of the solvent is much more effective.

My present invention is of special utility in connection with an apparatus for the treatment of ore slimes constructed in the manner disclosed in the above mentioned patent, but it will be understood that the invention is also of use in connection with apparatus of the same general character but differing in construction.

The invention involves the shaping of the bottom wall of the tank in such a manner that solid particles settling to the bottom of the tank will be deflected so as to bring them under or closer to the lower ends of the transfer pipes and thus insure that the solids will be taken up through the transfer pipes to the upper portion of the body of ore pulp within the tank. In an apparatus having provision for establishing circular motion of the slimes within the tank, such as that above referred to, the bottom of the tank is shaped to form a trough conforming to the shape of the tank, it being preferably circular and concentric with the cylindrical wall of the tank. This form of trough is preferably provided by a conically shaped member positioned upon the bottom of the tank and concentric with the cylindrical wall thereof, and a sloping side wall encircling this conical member and extending from the bottom of the tank up to the side wall thereof. The lower ends of the transfer pipes extend down into the trough thus provided. As a result of this construction, solids and heavier portions of the slimes settling within the tank are deflected by the sloping walls of the trough so that they are carried under or close to the lower ends of the transfer pipes, and are therefore drawn up through the pipes to the upper portion of the material within the tank.

I have illustrated the preferred embodiment of my invention in the accompanying drawings, in which—

Figure 2:
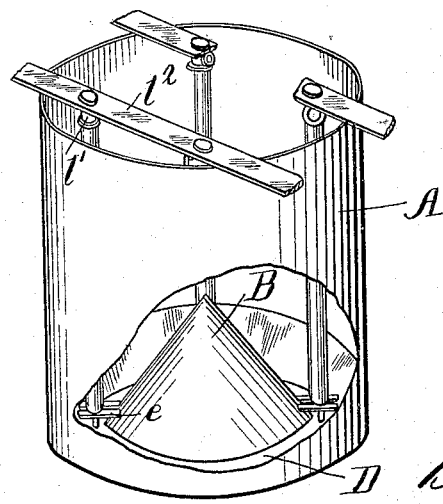

Figure 1 is a central section of the tank, and Fig. 2 is a perspective view with the side wall of the tank broken away to disclose the interior construction.

Referring to these drawings, A indicates a tank preferably of cylindrical form and constructed of wooden staves. In the lower portion of this tank is a trough preferably conforming in shape to the shape of the tank, in this case being circular. This trough is formed by a conical member B erected upon the bottom wall of the tank and concentric therewith. This conical member B forms one side of the trough and the other side consists of a wall C inclined from the bottom D of the tank up to the side wall. These two members, B and C, are preferably formed of wooden staves similar to those employed in the side wall of the tank.

The transfer of the slimes from the lower portion of the tank to the upper portion thereof is effected by transfer pipes E. Any desired number of these pipes may be employed, four being shown in the present instance. The pipes may be supported at their lower ends in any suitable manner, as, for instance, by struts $e$ extending between the side walls of the trough in the manner shown, and receiving the lower ends of the transfer pipes upon their upper surfaces. The lower end of each pipe E is open, as is shown at the right of Fig. 1, so as to permit free entrance of the slimes from the lower portion of the trough. The upper ends of the transfer pipes E are positioned by supports $e^2$, whose ends rest upon the top of the side wall of the tank.

The slimes are forced upwardly within the pipes E by compressed air which is led into the lower ends of the pipes E by air supply pipes F, each of which is provided with a suitable nozzle $f$ at its upper end. Each of the transfer pipes E is provided with an outlet $e'$ positioned at or near the surface of the material within the tank. These outlets $e'$ are arranged parallel to the adjacent side wall of the tank so that the material issuing from these outlets acts upon the material contained in the tank to set up a circular motion thereof within the tank. This circular motion of the material causes retardation of the settling of the heavier portions of the material, so that action of the solvent thereon is more effective. As settling does take place, however, these heavier portions of the material are deflected laterally by the sloping side walls B and C of the trough, so that they are carried down to points under or near the lower open ends of the transfer pipes E. By reason of this deflection of the heavier portions of the slimes, the raising of those portions of the slimes through the transfer pipes E is insured.

Another advantage flowing from the use of the construction herein shown is that the work of cleaning the tank can be readily performed. After an extended period of use the bottom of the tank becomes coated with the solid and semi-solid material in the solution. When the tank has been emptied, this deposit can be readily scraped off of the sloping sides of the trough to a suitable discharge opening in the bottom of the tank.

Instead of making the tank and the walls of the trough of wood as above described, they may be made of sheet-metal. But in some cases the use of metal in the construction of the tank cannot be resorted to because of the corrosive effect of acids in the solution, as for instance when treating copper in a solution containing surfuric acid. For such uses, the structure may be made of wood as above described.

I claim:

In apparatus of the character described, in combination, a receiving tank of circular form for the material to be treated, an annular trough in the bottom of the tank provided with sloping sides, transfer pipes within the tank having open lower ends extending within the trough and terminating adjacent the bottom thereof, the lower ends of said pipes being spaced from the sloping sides of the trough, outlets from said pipes near their upper ends and disposed parallel to the adjacent wall of the tank, and means for causing the material in the tank to flow upwardly through said pipes from the trough to and through said outlets, whereby a whirling motion is imparted to the entire body of the material in the tank from the top to the bottom thereof; substantially as described.

In testimony whereof I affix my signature, in presence of two witnesses.

BERNARD MacDONALD.

Witnesses:
ELLA SCOTT,
EDITH RAMSEY.